United States Patent [19]

Thacker

[11] Patent Number: 5,136,700

[45] Date of Patent: Aug. 4, 1992

[54] APPARATUS AND METHOD FOR REDUCING INTERFERENCE IN TWO-LEVEL CACHE MEMORIES

[75] Inventor: Charles P. Thacker, Palo Alto, Calif.

[73] Assignee: Digital Equipment Corporation, Maynard, Mass.

[21] Appl. No.: 454,922

[22] Filed: Dec. 22, 1989

[51] Int. Cl.⁵ .................. G06F 9/34; G06F 12/08
[52] U.S. Cl. .................. 395/400; 395/425; 364/DIG. 1; 364/DIG. 2
[58] Field of Search ... 364/200 MS File, 900 MS File; 395/400, 425

[56] References Cited

U.S. PATENT DOCUMENTS

| 4,173,781 | 11/1979 | Cencier | 395/775 |
|---|---|---|---|
| 4,442,487 | 4/1984 | Fletcher et al. | 364/200 |
| 4,464,712 | 8/1984 | Fletcher | 364/200 |
| 4,755,930 | 7/1988 | Wilson, Jr. et al. | 364/200 |
| 4,797,814 | 1/1989 | Brenza | 364/200 |
| 4,807,110 | 2/1989 | Pomerene et al. | 364/200 |
| 4,823,259 | 4/1989 | Aichelmann, Jr. et al. | 364/200 |
| 4,831,622 | 5/1989 | Porter et al. | 364/200 |
| 5,023,776 | 6/1991 | Gregor | 364/200 |

FOREIGN PATENT DOCUMENTS 0278196 8/1988 European Pat. Off. .
2344094 7/1977 France .

OTHER PUBLICATIONS

IBM Technical Disclosure Bulletin, vol. 27, No. 1A, Jun. 1984, pp. 298-300, Pomerene et al.
Thacker et al., "Firefly: A Multiprocessor Workstation" IEEE Transactions on Computers, vol. 37, No. 8, Aug. 1988, pp. 909-920.
Thacker, "Cache Strategies for Shared-Memory Multiprocessors," New Frontiers in Computer Architecture Conf. Proc., Citicorp/TTI, Mar. 1986.

Primary Examiner—Alyssa H. Bowler
Assistant Examiner—Michael A. Whitfield
Attorney, Agent, or Firm—Flehr, Hohbach, Test, Albritton & Herbert

[57] ABSTRACT

In a multiprocessor computer system, a number of processors are coupled to main memory by a shared memory bus, and one or more of the processors have a two level direct mapped cache memory. When any one processor updates data in a shared portion of the address space, a cache check request signal is transmitted on the shared data bus, which enables all the cache memories to update their contents if necessary. Since both caches are direct mapped, each line of data stored in the first cache is also stored in one of the blocks in the second cache. Each cache has control logic for determining when a specified address location is stored in one of its lines or blocks. To avoid spurious accesses to the first level cache when a cache check is performed, the second cache has a special table which stores a pointer for each line in said first cache array. This pointer denotes the block in the second cache which stores the same data as is stored in the corresponding line of the first cache. When the control logic of the second cache indicates that the specified address for a cache check is located in the second cache, a lookup circuit compares the pointer in the special table which corresponds to the specified address with a subset of the bits of the specified address. If the two match, then the specified address is located in the first cache, and the first cache is updated.

10 Claims, 4 Drawing Sheets

APPARATUS AND METHOD FOR REDUCING INTERFERENCE IN TWO-LEVEL CACHE MEMORIES

The present invention relates generally to the use of cache memory in multiprocessor systems which require cache coherence, and particularly to systems and methods for maintaining cache coherence in a multiprocessor system when using two-level cache memories.

BACKGROUND OF THE INVENTION

In some multiprocessor systems, the system's processors have shared memory— which means that the address spaces of the various processors overlap. If the processors utilize cache memories, it is possible for several copies of a particular block of memory to concurrently exist in the caches of different processors. Maintaining "cache coherence" means that whenever data is written into a specified location in a shared address space by one processor, the system determines whether that same memory location is stored in the caches of any other processors, and then updates or otherwise flags those caches. Numerous prior art articles have discussed various aspects of cache coherence. See for example, Thacker, Stewart, and Satterthwaite, Jr., "Firefly: A Multiprocessor Workstation," IEEE Transactions on Computers, Vol. 37, No. 8, pp. 909-920 (August 1988); and, Thacker, Charles P., "Cache Strategies for Shared-Memory Multiprocessors," New Frontiers in Computer Architecture Conference Proceedings, Citicorp/TTI (March, 1986), both of which are hereby incorporated by reference.

The present invention specifically concerns systems which use two-level caches. As CPU (central processing unit) speeds increase, more and more computers are using two-level caches. In a two-level cache the first level cache is small but very fast and is designed to supply most of the CPU's memory references at CPU speeds. Since in a high-performance CPU the speed disparity between the CPU and the main memory is very large (sometimes on the order of 100:1), a large but somewhat slower second level cache is placed between the first level cache and the main memory system. The first level cache usually contains a subset of the information in the second level cache.

FIG. 1 shows the basic architecture of a multiprocessor system 100. The system 100 has several CPUs 102, 104, 106, and an input/output processor 108, all of which are coupled to a large, but somewhat slow main memory 110 by a shared memory bus 112. Each CPU has a first level cache 120 which is small but very fast, and a second level cache 122 which is larger than the first level cache 120, but somewhat slower.

Using the so called "rule of 10", the first level cache 120 is typically about ten times as fast as the second cache 122, and about one tenth the size of the second cache 122. Similarly, the second level cache 122 is typically about ten times as fast as main memory 110, and about one tenth the size of main memory 110. Of course, these ratios are only ball park figures. Since caches and main memory tend to have sizes which are equal to a power of two (e.g., 16k or 64k bytes for a cache and 128 Meg for main memory), the actual ratios of cache and memory sizes will usually be factors of two (such as 4, 8, 16 or 32). For example, the first level cache 120 may have a size of 16k bytes with an access speed of 10 nanoseconds, the second level cache may have a size of 256k bytes with an access time of 100 nanoseconds, and main memory may have a size of 4,096k bytes with an access time of 500 nanoseconds.

Consider CPU 104 and its caches 120 and 122. When events elsewhere in the system (e.g., the i/o processor 108) cause entries in the second level cache 122 to be invalidated or updated with new data, it is necessary to determine whether or not these entries are also stored in the first level cache 120. Since the first level cache 120 is much smaller than the second level cache 122, it will usually be the case that the information is not present in the first level cache 120. In addition, accessing the first level cache 120 to determine the presence or absence of a data entry interferes with accesses by the CPU 104 and reduces overall system performance.

The preset invention makes it possible for the second level cache's control logic to determine whether a datum exits in the first level cache so that useless accesses to the first level cache can be avoided.

SUMMARY OF THE INVENTION

In summary, the present invention is a two-level cache memory for a processor in a multiprocessor computer system. A number of processors are coupled to a main memory by a shared memory bus, and one or more of the processors have a two level direct mapped cache memory. In addition, at least a portion of the computer system's address space is shared by these processors. When any one processor updates data in a shared portion of the address space corresponding signals are transmitted on the shared data bus, which enables all the cache memories to update their contents if necessary.

The two-level cache memory includes a first level cache which is small, but very fast, and a larger second cache which is slower than the first cache but much faster than main memory. Both caches are direct mapped, and each line of data stored in the first cache is also stored in one of the blocks in the second cache. As is standard, each cache has control logic for determining when a specified address (i.e., memory location) is stored in one of its lines or blocks.

The goal of the invention is to avoid accessing the first level cache for cache coherence checking, unless the updated location is actually stored in the first cache, because unnecessary coherence checking accesses to the first cache interfere with access by the processor and reduce the performance of the system.

To avoid spurious accesses to the first level cache when a cache check is performed, the present invention provides the second cache with additional hardware for determining whether the specified location that is being updated by the cache check is located in the first cache. In particular, the second cache includes a special table (i.e., memory array) which stores a pointer for each line in the first cache. This pointer denotes the block in the second cache which stores the same data as is stored in the corresponding line of the first cache.

When the control logic of the second cache indicates that the specified address is located in the second cache, a lookup circuit in the second cache compares the pointers in the special table which correspond to the specified address with a predefined portion of the specified address. If the two match, then the specified address is located in the first cache, and the first cache is updated.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
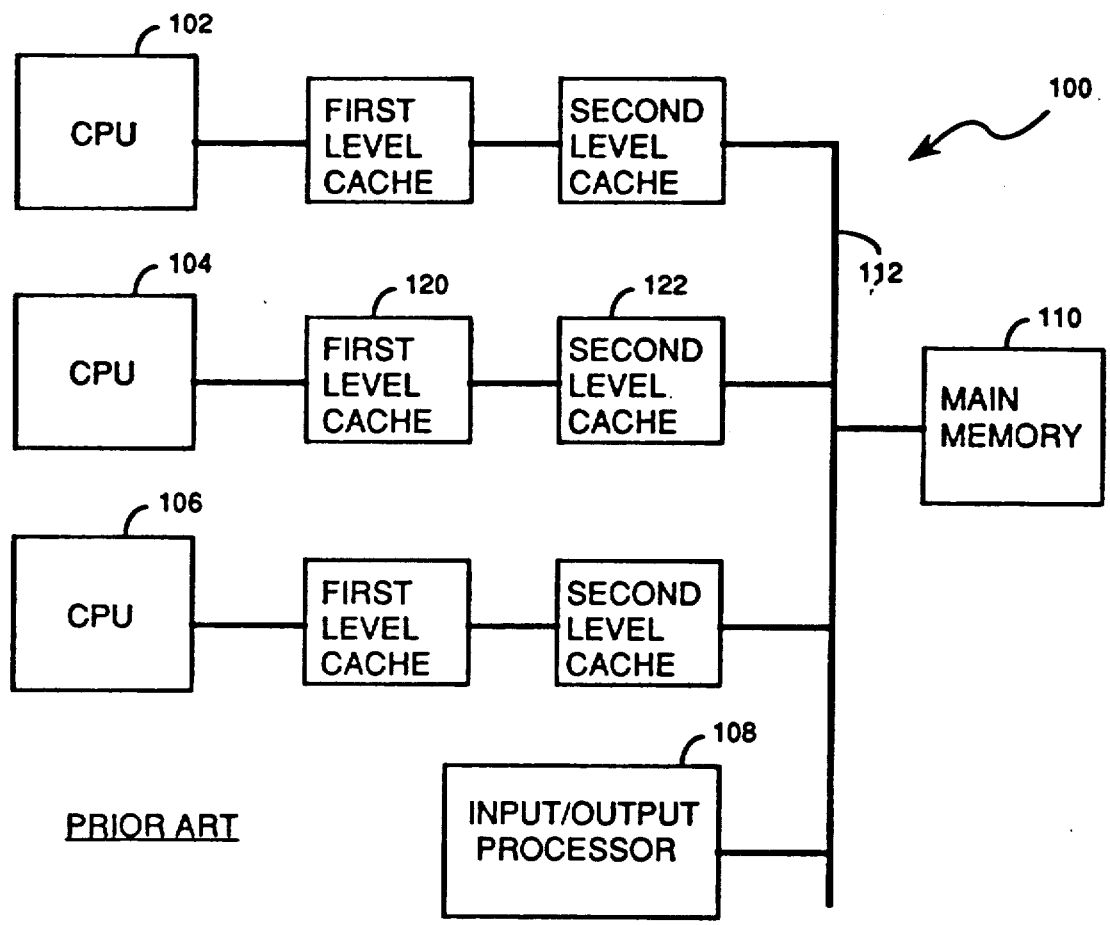
FIG. 1 is a block diagram of a multiprocessor computer system in which a plurality of the processors have two-level caches.

Referring to FIG. 1, there is shown a multiprocessor computer system in which a plurality of the processors have two-level caches. The motivation for having two-level caches is as follows. For a CPU connected to a memory through a single level cache, the effective (i.e., average) access time $T_{acc}$ for memory references made by the CPU is:

$$T_{acc} = (T_{cache1} * h1) + T_{memory} * (1-h1)$$

where $T_{cache1}$ is the access time of the cache, $T_{memory}$ is the access time of the main memory, and h1 is the fraction of the time that accesses are contained in (or "hit in") the cache. h1 is sometimes called the hit rate.

For a CPU connected to a memory through a two-level cache, the effective (i.e., average) access time $T_{acc}$ for memory references made by the CPU is:

$$T_{acc} = T_{cache1} * h1 + (1-h1)(T_{cache2} * h2 + T_{memory} * (1-h2))$$

where $T_{cache1}$ is the access time of the first (high speed) cache, $T_{cache2}$ is the access time of the second, slower cache, $T_{memory}$ is the access time of the main memory, h1 is the hit rate of the first cache and h2 is the hit rate of the second cache.

$T_{cache1}$ is usually one or two CPU cycle times, whereas $T_{memory}$ may be hundreds of cycles in a system with a fast CPU. The goal of designing the overall system is to minimize $T_{acc}$ while providing a practical and economical implementation of the caches. In a high performance system, this can be done by providing a two-level cache, in which the first level is much smaller than the second level cache. The small size of the first cache will cause the hit rate of the first cache h1 to be small, on the order of 0.8, while the hit rate of the second cache h2 will be very close to 1.0. The first level cache must be small so that it can be fast and inexpensive, while the second level cache must be large so that misses in the small cache only rarely incur the large time penalty of a main memory access.

In a multiprocessor system, or a system in which an input/output device can write data to main memory, maintaining cache coherence requires that each of the system's caches be able to determine whether each memory update performed affects data stored that cache. For instance, in the context of FIG. 1, whenever a memory location is updated by one of the processors 102, 104, 106 or 108, the memory bus 112 carries signals which denote the address (i.e., location) of the data that is being updated, which allows the caches of the other processors to determine whether they currently store data at the specified location. In other words, the caches of each processor monitor the memory bus 112 and update their contents when necessary in order to maintain cache coherency.

In a two-level cache system, the second level cache 122 can be considered to be a resource that is shared by the CPU 104 and the memory bus 112. The CPU 104 uses the second level cache 122 to satisfy memory references to memory locations that are not found in the first level cache 120, and the memory bus 112 "uses" the second level cache 122 to maintain cache coherence. Thus, the memory bus 112 and the CPU 104 compete for use of the second level cache 122. In the preferred embodiment, the timing requirements of the memory bus 112 require that the memory bus 112 have absolute priority over the CPU 104 when both devices are trying to access the second level cache 122.

In addition, it may be noted that in the types of high performance computer systems in which two-level caches are used, the first level cache 120 is often manufactured as a part of the CPU 104. That is, the CPU 104 and first level cache 120 are formed on the same silicon die so as to minimize signal delays and so that the first level cache 120 can be accessed by the CPU 104 in the one CPU cycle.

From the viewpoint of each second level cache 122, the signals on the memory bus 112 associated with a memory write operation can be interpreted as a "cache update request"—i.e., a request to update or invalidate the contents of the cache 122, if the specified location is currently stored in the cache. It is a matter of design choice as to whether such requests will cause data in the caches to be updated or invalidated. For the purposes of the present invention, we will use the term "updating the contents of the cache" to mean either replacing the stored data or invalidating it, since in either case the contents of the cache is changed if the specified location is stored in the cache.

For instance, the cache updating protocol used in the preferred embodiment works as follows. Whenever a memory location is updated by any processor, the address of the updated location is broadcast on the shared memory bus 122. Each of the second level caches compare the broadcast address with their tag memories to determine whether the specified location is stored in the cache. If so, an entire block of data is loaded into the cache so that the second level cache contains valid data. In addition, if the location is also stored in the first level cache, the corresponding line(s) in the first level cache is (are) marked as invalid. When the CPU next tries to access a location in the line marked as invalid, the line will be loaded from the second level cache into the first level cache.

In other embodiments of the present invention it may be desirable to simply invalidate a block in the second level cache whenever a corresponding memory location is updated. In the preferred embodiment it is relatively easy to update a block in the cache due to the very wide memory bus that is used. For further information on cache update protocols, see "Cache Strategies for Shared-Memory Processors", cited and incorporated by reference above.

It is desirable for "cache update requests" to go only to the second level cache in a two-level cache arrangement. This is because the location being updated will usually not be in the small, first level cache. As a result, if the contents of the first level cache are checked for every cache update request, most of the work done in the course of accessing the first level cache to determine whether its contents need to be updated will be wasted. Most importantly, these spurious accesses to the first level cache interfere with memory requests by the CPU, and therefore system performance is needlessly reduced.

To avoid spurious first level accesses, the present invention provides a mechanism in the second level cache's control logic for determining whether a specified location is in the first level cache, without actually referencing the first level cache.

In the present invention, both the first and second level caches are direct mapped. This means that data stored in a particular address in main memory can be stored in only one location in the cache.

CACHE ARRAYS, TAGS and LOGIC

Figure 2:
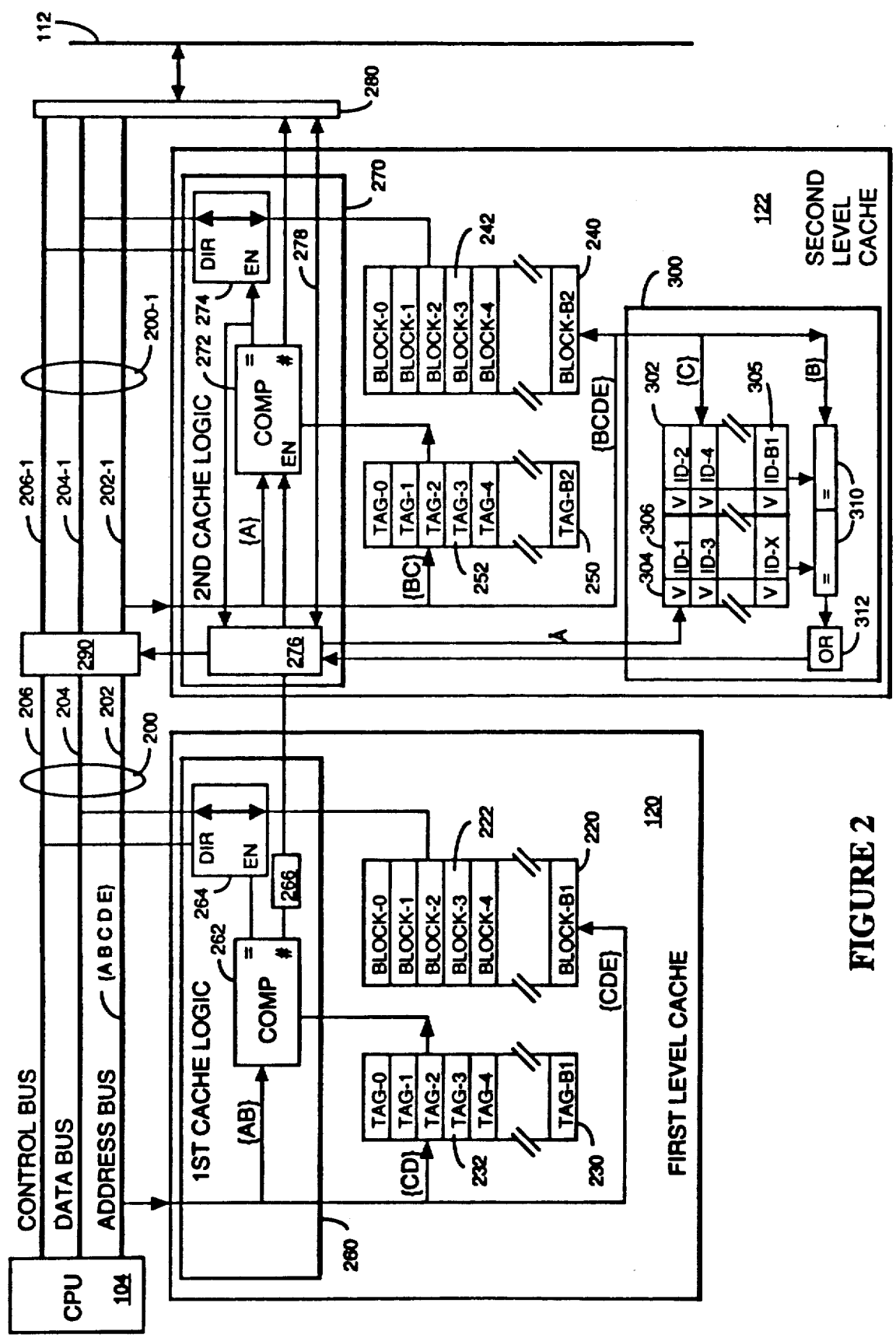
FIG. 2 is a block diagram of a first preferred embodiment of a two-level cache.

Referring to FIG. 2, each CPU has a local bus 200, including an address bus 202, a data bus 204 and a control bus 206. The address bus 202 carries a set of binary address signals. For convenience, the address bits are broken down into five subsets, denoted here as ABCDE, where "A" denotes the most significant bits, "B" denotes one or more of the next most significant bits, and so on through "E" which denotes the least significant bits. The reason for dividing the bits of each address into five portions will become apparent from the following discussion.

Direct map caches work as follows. Referring to the first level cache 120, the cache contains a high speed memory array 220, which includes a set of B1 blocks, and having an access time of about 10 nanoseconds. Note, that for the purpose of easily distinguishing blocks in the first level cache 120 from blocks in the second level cache 122, the blocks in the first level cache 120 are herein referred to as "lines", while the blocks in the second level cache 122 are called "blocks".

Each line 222 in the array 220 has a set size, which is generally equal to a power of 2 (i.e., $2^X$, where X is a positive integer). In addition, there is a high speed tag memory 230 which stores one tag 232 for each line 222. Each line's tag 232, along with the position of line in the array 220, identifies the location in main memory of the line 222. Furthermore, each tag 232 contains a status flag, sometimes called the "valid flag", that denotes whether the data stored in the corresponding line is valid. To make this more concrete, consider the following.

Figure 3A:
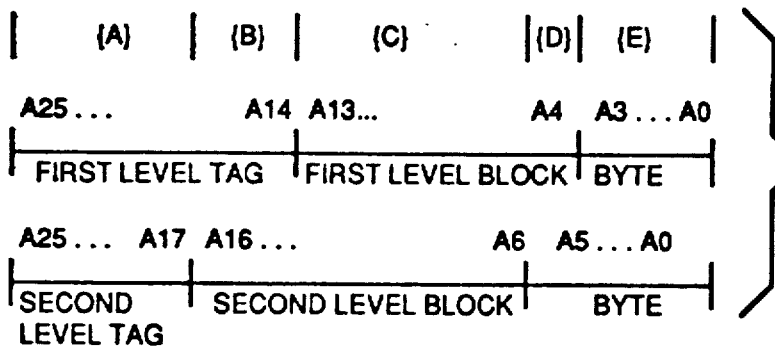
FIGS. 3A and 3B show the allocation of address bits for two preferred embodiments of the present invention.

Referring to FIGS. 2 and 3A, the address space of the main memory is represented by address bits ABCDE, where "E" is the set of bits required to specify the address or location of each byte or word in a line 222 of the first level cache. Bits "CD" acts as an index into the arrays 220 and 230, and identifies the position of the line 222 in the array 220 which is being accessed. The tag 232 for a particular line stores the value "AB" of a particular block of memory. Thus the location of a line 232 in the cache is identified by "AB" (from the corresponding tag) and "CD" (the index value of the line).

In some two-level caches, the second cache 122 will have larger blocks than the first cache 120, and will also have more blocks than the first cache 120. The basic structure of the second cache 122 includes a moderately high speed memory array 240, which includes a set of B2 blocks, with an access time of about 100 nanoseconds. B2 is typically equal to a power of two which is at least twice as large as B1. Each block 242 in the array 240 has a set size (i.e., a predetermined number of bytes or words), which is also generally equal to a power of two. In addition, there is a tag memory 250 which stores one tag 252 for each block 242. Each block's tag 252, along with the position of block in the array 240, identifies the location in main memory of the block 242.

As before, the address space of the main memory is represented by address bits ABCDE. For this second cache, address bits "DE" are the set of bits required to specify the address or location of each byte or word in the block 242. Note that blocks 242 in the second cache 122 are larger than the blocks 222 in the first cache, and therefore the system requires more address bits to address the data stored in each second cache block—as represented by bits "DE". Bits "BC" are used as the index into the arrays 240 and 250, and identify the position of the block in the array 240. The tag 252 for a particular block stores the value "A" of a particular block of memory. Thus the location of a block 252 in the cache is identified by "A" (from the corresponding tag) and "BC" (the index value of the block).

To make this addressing and cache organization scheme more tangible, we give a specific example. The main memory stores 64 Megabytes of data, requiring 26 address bits A25 through A0. The first cache is a 16 kilobyte memory, with 1024 lines, each of which stores 16 bytes. The second cache is a 128 kilobyte memory, with 2048 blocks, each storing 64 bytes. Referring to FIG. 3A, the address bits in the system are labelled A25, A24, A0, with A25 being the most significant bit and A0 being the least significant bit. The ABCDE representation of the address bits would be as follows: "A" represents address bits A25-A17, "B" represents address bits A16-A14, "C" represents address bits A13-A6, "D" represents address bits A5-A4, and "E" represents address bits A3-A0.

In the present invention, the first cache 120 contains a subset of the data stored in the second cache 122. Thus all data stores in the first cache 120 can also be found in the second cache 122.

Normal operation of the caches 120 and 122 works as follows. When the CPU 104 performs a memory access, the address to be accessed is asserted on the address bus 202, and read/write control signals are asserted on the control bus 206. During write operations, data is also asserted on the data bus 204. Denoting the asserted address as ABCDE, as described above, the control logic 260 of the first cache 120 uses the "CD" address bits to index into the tag array 230. A comparator 262 compares the value of the indexed tag 232 with address bits "AB". While this comparison is being performed, the cache array 220 is accessed using address bits "CDE". If the comparator 262 determines that the tag 232 and "AB" are equal, then buffer 264 is enabled, allowing the flow of data between the addressed location in the cache array 220 and the data bus 204. That is, during a read operation the addressed location in the cache is asserted on the bus 204, and during a write operation the data on the bus 204 is written into the cache at the specified location.

If the comparator 262 in the first cache 120 does not find a "hit", the second cache 122 tries to satisfy the memory request. In particular, the control logic 270 of the second cache uses the "BC" address bits to index into the tag array 250. A comparator 272 compares the value of the indexed tag 252 with address bits "A". While this comparison is being performed, the cache array 240 is accessed using address bits "BCDE". If the comparator 272 determines that the tag 252 and "A" are equal, then buffer 274 is enabled, allowing the flow of data between the addressed location in the cache array 240 and the data bus 204.

If should also be noted that, since the data in the two caches 120 and 122 must be consistent, logic 266 in the first cache enables the second cache's buffer 274 when data is being writing into the first cache 120, so that the same data is stored in the second cache.

If the comparator 272 in the second cache 122 does not find a "hit", the second cache passes the access request to its shared memory bus interface 280, which then fetches from main memory the specified datum so as to satisfy the CPU's request. More specifically, the interface 280 fetches from main memory an entire block of data corresponding address bits "ABC" and loads this data into the block 242 of the second cache array 240 corresponding to the value of address bits "BC". This enables the second level cache 122 to satisfy the CPU's request. At the same time, the tag entry 232 for the line 222 in the first level cache corresponding to the value of address bits "CD" is marked as invalid.

CACHE COHERENCE

Next, we consider what happens when one processor in the system updates data that is shared by other processors. The tag array 250 in the second cache includes two status flags for each block 242: a "valid flag" which denotes whether the block 242 contains valid data, and a "SHARED flag" which denotes whether the same block of data may be stored in the cache of any other processor in the system. While the exact mechanism for updating these status flags is not relevant to the present invention, the structure of the shared memory bus 112 does affect the operation of the second level cache.

When an input/output processor writes data to memory, or a CPU writes new data to a cache block that is marked as possibly being stored in other caches, the input/output processor or the second level cache asserts a "write command" and a set of address signals on the shared memory bus 112. Referring to FIG. 3C, in the preferred embodiment the bus 112 includes a 64 bit binary data bus 113 which is also used to transmit address signals and read/write commands, a Shared signal line 114, a dirty signal line 115, three clock lines 116, an arbitration bus 117, two parity lines 118 and fourteen binary lines 119 for transmitting error correction codes. Only the use of the data bus 113 and the Shared line 114 are relevant to the present invention. The arbitration bus 117 is used to arbitrate simultaneous requests to use the bus. The clock lines 116 are used to control the timing of data transmissions over the bus 112, and the parity and error correction code lines 118 and 119 are used to transmit standard parity and error correction code signals.

The 64 binary data/address lines 113 are time multiplexed so that address and command signals are transmitted during a first time period, and data are transmitted over the same lines during later time periods. When a CPU access to the second level cache results in a miss, the second level cache transmits a read command and a specified address on the bus 112. Normally, the requested block of data is then transmitted by the main memory 110 onto the bus. However, if any of the other second level cache's contain more up-to-date data for the specified address, that second level cache asserts an enable signal on the dirty line 115, in which case that second level cache sends the requested data instead of the main memory.

Whenever a second cache 122 detects a write command on lines 113, it compares the transmitted address with a corresponding tag 252 in the second level tag array 250. If there is a match, the second level cache 122 asserts an enable signal on the Shared line 114, thereby indicating that it wants the owner of the newly updated data to transmit it over the bus so that the contents of the second level cache can be updated. The system component which generated the write command detects the Shared signal and responds by transmitting a block of data over the bus 112.

In terms of the system shown in FIG. 2, when a write command on the shared memory bus 112 is detected by cache logic 270, logic 276 in the second cache 122 disables bus buffer 290, which allows the CPU to use local bus 200 to fetch data from the first cache 120 while the second cache 122 is performing a cache check operation. Bus buffer 290 is normally enabled so that two local busses 200 and 200-1 act as one, and is disabled only during cache checking.

Logic circuit 276 is a state machine which governs the status of the bus buffer 290 and the cache array access circuits 272 and 274. Logic circuit 276 also governs the process of loading new blocks of data into the first and second level caches when the CPU references a memory location that is not stored in either one of the caches.

When the second cache performs a cache check operation, the signals on the local address and control lines 202-1 and 206-1 are being asserted by the shared bus interface 280 instead of the CPU 104. Note that logic 276 enables comparator 272 when a write command (i.e., a cache check request) is received on line 278 from the shared bus interface 280. If the specified address is located in the second cache array 240, the second level cache logic 270 asserts an enable signal on the Shared line 114 of the bus 112, via interface 280, which causes a block of new data to be stored in the cache array 240.

We have now reached the problem which is addressed by the present invention: accessing the first level cache 120 only if the specified address associated with the cache check is located in the first level cache array 220. For this purpose, the present invention provides a special circuit 300. Circuit 300 contains a high speed memory array 302 which stores a table of data. Array 302 contains an entry 305 for each block 222 in the first level cache 120, including a valid flag 304 which denotes whether the corresponding block 222 in the first cache contains valid data, and a pointer 306 to the block 242 in the second cache array 242 from which the block 222 in the first cache came. In particular, the pointer 306 is equal to the "B" address bits using the division of address bits described above.

In addition, array 302 is organized as K parallel subtables 302-1 to 302-K, so that K of these pointers 306 are accessed simultaneously, where K is the ratio of the sizes of the second level cache block size to the first level cache line size. For example, if the blocks 242 in the second level cache 122 are twice as large as the lines 222 in the first level cache 120, K is equal to two. As shown in FIG. 2, all of the simultaneously accessed entries 306 are at the same position in the parallel subtables. These entries 302 are indexed by the "C" address bits (i.e., there are K entries for each possible value of the "C" address bits).

Using the cache block and line sizes described above with reference to FIG. 3A, K would be equal to four, because the blocks in the second level cache are four times as large as the lines in the first level cache.

When the second level cache is performing a cache check to determine if new data must be stored in one of its blocks, the second level cache's logic 300 simultaneously determines whether the first level cache will also need to be updated. If circuit 300 determines that the first level cache does need to be updated, the bus buffer 290 will be enabled and the first cache array 220 is updated. In other words, if circuit 300 determines that the first level cache needs to be updated, either the corresponding line of the first cache will be marked as invalid, or the update data will be loaded into the appropriate block of the first cache array 220, as determined by the address signals on the address bus. If circuit 300 determines that the first cache does not need to be updated, the buffer 290 remains disabled until the cache check is complete.

Circuit 300 works as follows. First of all, note that the output of the address comparator 272 in the second cache goes to logic circuit 276. If the requested address is not in the second level cache, then it cannot be in the first level cache and no further action is required—and therefore the output signals generated by circuit 300 are ignored. Only when a hit is found in the second cache does the logic circuit 276 use the signals generated by circuit 300.

All the entries 305 of array 302 specified by the "C" address bits are accessed. Each of the pointers 306 in these K entries are compared by a comparator 310 with the "B" address bits, which also checks the valid flag 304 of the corresponding entry. The results from all the comparators 310 are combined with an OR gate 312, which will issue an enabled signal only if there is at least one line in the first level cache which needs to be updated. The output signal from the OR gate 312 is sent to logic circuit 276, which then enables bus buffer 290 if the first level cache needs to be updated.

The reason that circuit 300 works is as follows. If the second level cache is J times larger than the first cache, then the data for any given first level cache block can be stored in any of J different blocks in the second level cache. For example, referring to FIG. 3A, if the following address that K is equal to $2^N$, where N is the number of "D" address bits. Thus, for any given value of the "C" address bits there are K lines in the first level cache which may be mapped into the updated second level cache block, and therefore there are K pointers in array 302 which must be checked to determine whether any lines in the first level cache need to be updated.

For reasons of speed, in the preferred embodiment all the entries in array 302 which correspond to the updated second level cache block are checked simultaneously, requiring that the number of comparators 310 be equal to K, where K is the ratio of the second cache's block size to the first cache's line size. If K is large (e.g., greater than 16), the K entries in array can be checked serially, for example by serially checking batches of the entries.

The table stored in array 302 is updated as the contents of the first level cache change, either due to misses that cause it to be reloaded from the second level cache, or by invalidations or updates received from other parts of the computer system. These updates can be done by the second level cache logic 270 in conjunction with the work necessary to reload the first level cache 120 and therefore do not hurt the performance of the caches. Furthermore, since the information stored in the array 302 is a subset of the information stored in the tag array 230 of the first level cache, it takes no extra work to compute the values to be stored in the array 302.

Figure 3B:
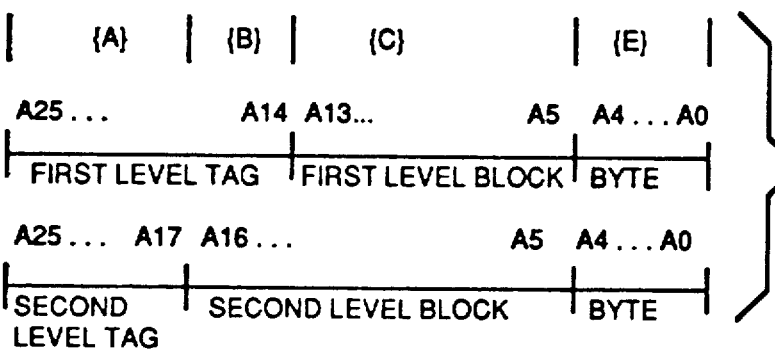
Figure 3C:
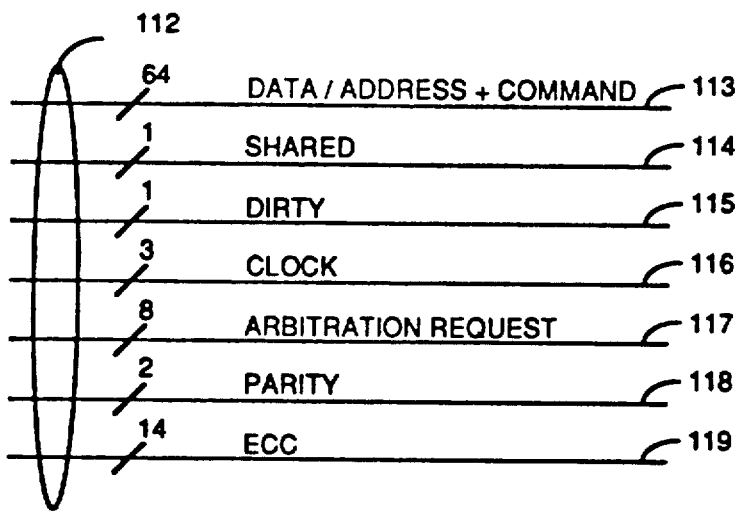
FIG. 3C shows the components of the shared memory bus in the preferred embodiments.
Figure 4:
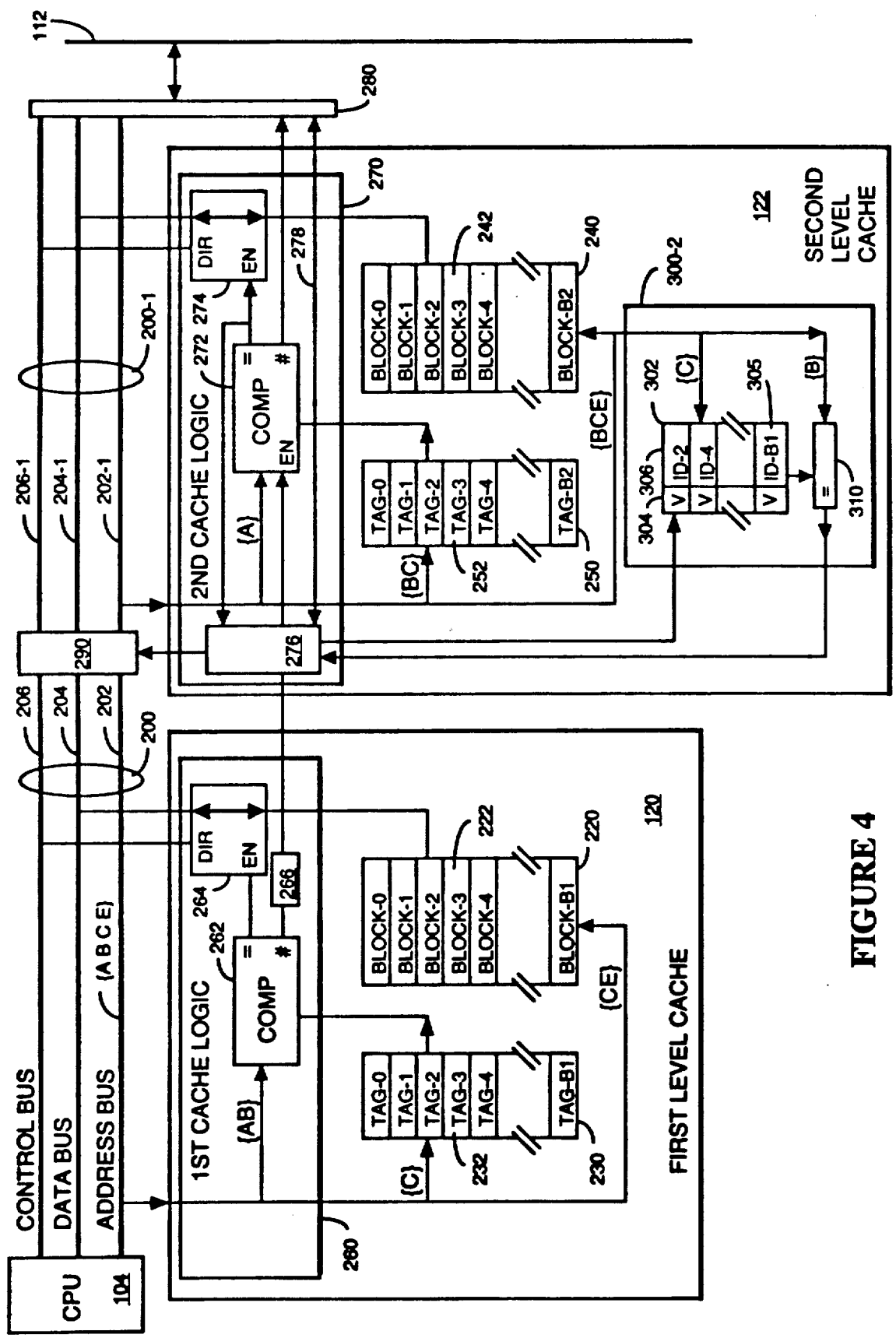
FIG. 4 is a block diagram of a second preferred embodiment of a two-level cache.

Referring to FIGS. 3B and 4, there is shown a two-level cache for a system in which the line size in the first level cache is equal to block size in the second level cache. That is, K, as defined above, is equal to 1. Also, there are no "D" address bits because the "D" address bits represent the difference in block sizes between the two cache levels. In this second preferred embodiment the line and block sizes are equal to 64 bytes, with the first cache having a size of 16 kilobytes and the second level cache having a size of 128 kilobytes. It is interesting to note that using the 64 bit wide memory bus 112 (shown in FIG. 3C) it takes only four data transmission cycles to load an entire block of data into the second level cache.

In this preferred embodiment the circuit 300-2 is somewhat simpler than circuit 300 in the first preferred embodiment, because only one entry 305 in the array 302 needs to be checked to determine whether the first

| portion: | A | B | C | D | E |
|---|---|---|---|---|---|
| address: | 00001110 | XXX | 100011111 | 11 | 11101 |
| bus line: | AAAAAAAA | AAA | AAAAAAAA | AA | AAAAA |
| | 22222111 | 111 | 111111111 | 11 | 11111 |
| | 543210987 | 654 | 323109876 | 54 | 32310 | is stored in the first level cache, the index value of the first level cache block 222 in which it is stored is 10001111111 (i.e., the "CD" address bits), and the index value of the second level cache block 242 in which it is stored is XXX100011111 (i.e., the "BC" address bits). The corresponding pointer 306 stored in array 302 will have a value of XXX (i.e., the "B" address bits). Thus, since there are eight possible values of XXX, there are eight possible blocks in the second level cache in which this address will be located.

Looking at this problem from the opposite perspective, if the blocks in the second level cache are K times the size of the lines in the first level cache, the data in as many as K lines in the first level cache 120 may be stored in any one block of the second level cache. Note cache needs to be updated. Thus, there is only one comparator 310 and no OR gate 312 (see FIG. 2). In all other respects, the operation of this embodiment of the invention is the same as the embodiment shown in FIG. 2 and discussed above.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A two-level cache memory for a first processor in a computer system having a multiplicity of processors and a main memory coupled to said processors by a shared bus, said main memory storing data at specified addresses within a predefined address space;
- a first direct mapped cache memory that stores lines of data, said first direct mapped cache memory coupled to said first processor by a local bus and including first tag means for denoting what portion of said address space is stored in each of said lines;
- a second direct mapped cache memory that stores blocks of data, said second direct mapped cache memory coupled to said first direct mapped cache memory and coupled to said local bus by a bus buffer and including second tag means for storing address data denoting what portion of said address space is stored in each of said blocks;
- wherein each line of data stored in said first direct mapped cache memory is also stored in one of said blocks in said second direct mapped cache memory;
- said second direct mapped cache memory including cache coherence logic, coupled to said shared bus and said second tag means, for responding to memory write signals on said shared bus indicating that updated data has been written to a specified address in said address space by another one of said multiplicity of processors; said cache coherence logic including:
  - (1) means for temporarily disabling said bus buffer while said cache coherence logic in said second level cache means responds to said memory write signals on said shared bus so that said processor can continue to access said first cache means while said cache coherence logic determines whether said first cache means is storing data for said specified address;
  - (2) table means for data representing the portion of said address space stored in each of said lines of said first level cache means;
  - (3) second cache coherence means for comparing said specified address with said second tag means and, when a match is found, updating a corresponding block of said second level direct mapped cache memory; and
  - (4) first cache coherence means for comparing said specified address with said data in said table means and, when a match is found and said second cache coherence means also finds a match, enabling said bus buffer and sending signals to said first level cache which command it to update a line of said first level direct mapped cache memory corresponding to said specified address.

2. In a computer system having a multiplicity of processors, a main memory coupled to said processors by a shared bus, said main memory storing data at specified addresses within a predefined address space, said predefined address space being at least partially shared by said multiplicity of processors, said shared bus carrying signals which denote addresses to which data is being stored by said processors;
- at least one of said processors including a two-level cache memory, comprising:
- first level cache means, coupled to said processor by a local bus, for providing said processor with access to portions of said address space at higher speed than said main memory, said first level cache means including a first direct mapped cache array for storing lines of data and first tag means for denoting what portion of said address space is stored in each of said lines;
- second level cache means, coupled to said first level cache and coupled to said local bus by a bus buffer, for providing said processor with access to portions of said address space at higher speed than said main memory and at slower speed than said first level cache means, including a second direct mapped cache array for storing blocks of data and second tag means for storing address data denoting what portion of said address space is stored in each of said blocks, wherein said second level cache means has at least twice as much storage capacity as said first level cache means;
- wherein each line of data stored in said first direct mapped cache array is also stored in one of said blocks in said second direct mapped cache array; and
- said second level cache means including cache coherence logic, coupled to said shared bus and said second tag means, for responding to memory write signals on said shared bus indicating that updated data has been written to a specified address in said address space by another one of said multiplicity of processors; said cache coherence logic including:
  - (1) means for disabling said bus buffer while said cache coherence logic in said second level cache means responds to said memory write signals on said shared bus so that said processor can continue to access said first cache means while said cache coherence logic determines whether said first cache means is storing data for said specified address;
  - (2) table means for storing address data that, in conjunction with the address data stored in said second tag means, represents the portion of said address space stored in each of said lines of said first level cache means;
  - (3) second cache coherence means for comparing said specified address with said second tag means and, when a match is found, updating a corresponding block of said second direct mapped cache array; and
  - (4) first cache coherence means for comparing said specified address with said address data in said table means and, when a match is found and said second cache coherence means also finds a match, enabling said bus buffer and sending signals to said first level cache which command it to update a line of said first direct mapped cache array corresponding to said specified address.

3. A two-level cache memory as set forth in claim 2, wherein said specified address is designated by a multiplicity of address bits,
- said first cache coherence means including comparison means coupled to said table means for accessing address data in said table means corresponding to said specified address and comparing said accessed address data with a predefined portion of said address bits.

4. A two-level cache memory as set forth in claim 2, wherein said specified address is designated by a multiplicity of address bits, and said blocks of data in said second level cache means are K times as large as said lines of data in said first level cache means, where K is an integer greater than one;

said first cache coherence means including comparison means coupled to said table means for accessing K address values in said table means corresponding to said specified address and for simultaneously comparing said K accessed address values with a predefined portion of said address bits.

5. A two-level cache memory for a first processor in a computer system having a multiplicity of processors and a main memory coupled to said processors by a shared bus, said main memory storing data at specified addresses within a predefined address space;
- a first direct mapped cache memory that stores lines of data, said first direct mapped cache memory coupled to said first processor by a local bus and including first tag means for denoting what portion of said address space is stored in each of said lines;
- a second direct mapped cache memory that stores blocks of data, said second direct mapped cache memory coupled to said first direct mapped cache memory and coupled to said local bus by a bus buffer and including second tag means for storing address data denoting what portion of said address space is stored in each of said blocks;
- wherein each line of data stored in said first direct mapped cache memory is also stored in one of said blocks in said second direct mapped cache memory;
- said second direct mapped cache memory including cache coherence logic, coupled to said shared bus and said second tag means, for responding to memory write signals on said shared bus indicating that updated data has been written to a specified address in said address space by another one of said multiplicity of processors; said cache coherence logic including:
  (1) means for disabling said bus buffer while said cache coherence logic in said second direct mapped cache memory responds to said memory write signals on said shared bus so that said processor can continue to access said first cache memory while said cache coherence logic determines whether said first cache means is storing data for said specified address;
  (2) table means for storing address data that, in conjunction with the address data stored in said second tag means, represents the portion of said address space stored in each of said lines of said first direct mapped cache memory;
  (3) second cache coherence means for comparing said specified address with said second tag means and, when a match is found, updating a corresponding block of said second direct mapped cache memory; and
  (4) first cache coherence means for comparing said specified address with said address data in said table means and, when a match is found and said second cache coherence means also finds a match, enabling said bus buffer and sending signals to said first direct mapped cache memory which commands it to update one said line of data corresponding to said specified address.

6. A two-level cache memory as set forth in claim 5, wherein said specified address is designated by a multiplicity of address bits, and said blocks of data in said second direct mapped cache memory are K times as large as said liens of data in said first direct mapped cache memory, where K is an integer greater than one;
said first cache coherence means including comparison means coupled to said table means for accessing K address values in said table means corresponding to said specified address and for simultaneously comparing said K accessed address values with a predefined portion of said address bits.

7. A two-level cache memory as set forth in claim 6, wherein said processors include means for transmitting address and command signals on said shared bus when updating data stored at specified addresses in said address space;
- said second direct mapped cache memory including means for monitoring address and command signals on said shared bus;
- said second cache coherence means including means for generating an enabled access signal when said monitored address and command signals on said shared bus denote that another processor has updated data stored in one of said blocks in said second direct mapped cache memory;
- said first cache coherence means including means for generating an enabled first cache lookup signal when said monitored address and command signals denote that another processor has updated data stored in one of said lines in said first direct mapped cache memory;
- said first direct mapped cache memory including means responsive to said enabled first cache lookup signal for updating the data stored in said first direct mapped cache memory.

8. A method of operating a two-level cache memory for a first processor in a computer system having a multiplicity of processors and a main memory coupled to said processors by a shared bus, said main memory storing data at specified addresses within a predefined address space;
- storing lines of data in a first direct mapped cache memory, coupled to said first processor by a local bus, and storing in a first tag array associated with said first direct mapped cache memory a line tag for each of said lines denoting what portion of said address space is stored in said line;
- storing blocks of data in a second direct mapped cache memory, coupled to said first direct mapped cache memory and coupled to said local bus by a bus buffer, and storing in a second tag array associated with said second direct mapped cache memory a block tag for each said block denoting what portion of said address space is stored in said block;
- wherein each line of data stored in said first direct mapped cache memory is also stored in one of said blocks in said second direct mapped cache memory;
- storing in a table memory, associated with said second direct mapped cache memory, a pointer value for each said line in said first direct mapped cache memory denoting a block in said second direct mapped cache memory which stores the same data as is stored in said line;
- detecting memory write signals on said shared bus and responding thereto by temporarily disabling said bus buffer so that said processor can continue to access said first direct mapped cache memory;
- comparing said specified address with a block tag in said second tag array and, when a match is found, updating a corresponding block of said second direct mapped cache memory; and comparing a predefined portion of said specified address with corresponding ones of said pointer values in said table memory and, when a match is found and said first comparing step also finds a match, enabling said bus buffer and sending signals to said first direct mapped cache memory which command it to update one said line of data corresponding to said specified address.

9. A method of operating a two-level cache memory as set forth in claim 8, wherein said specified address is designated by a multiplicity of address bits, and said blocks of data in said second direct mapped cache memory are K times as large as said lines of data in said first direct mapped cache memory, where K is an integer greater than one;

said comparing step including the steps of accessing K pointer values in said table means corresponding to said specified address and comparing simultaneously said K accessed pointer values with a predefined portion of said address bits.

10. A method of operating a two-level cache memory as set forth in claim 8, wherein said processors transmit address and command signals on said shared bus when updating data stored at specified addresses in said address space;

said method including the steps of:

monitoring address and command signals on said shared bus;

generating an enabled second cache access signal for updating said second direct mapped cache memory when said monitored address and command signals on said shared bus denote that another processor has updated data stored in one of said blocks in said second direct mapped cache memory;

comparing a predefined portion of said monitored address signals with corresponding ones of said pointer values, and generating an enabled first cache lookup signal when said comparison produces a match and said generating step generates an enabled second cache access signal; and in response to said enabled first cache lookup signal, updating the data stored in said first direct mapped cache memory.

* * * * *

UNITED STATES PATENT AND TRADEMARK OFFICE
CERTIFICATE OF CORRECTION

PATENT NO. : 5,136,700
DATED : August 4, 1992
INVENTOR(S) : Charles P. Thacker

It is certified that error appears in the above-identified patent and that said Letters Patent is hereby corrected as shown below:

Column 7,
Line 5, delete "If" and insert therefor -- It --

Column 13,
Line 67, delete "liens" and insert therefor -- lines --

Signed and Sealed this

Twenty-first Day of June, 2005

JON W. DUDAS
*Director of the United States Patent and Trademark Office*